(12) United States Patent  (10) Patent No.: US 7,076,614 B2
Sperber et al.  (45) Date of Patent: Jul. 11, 2006

(54) SYSTEM AND METHOD FOR OPTIMIZING BUS BANDWIDTH UTILIZATION BY GROUPING CACHE WRITE-BACKS

(75) Inventors: Zeev Sperber, Zichron Yaakov (IL); Gabi Malka, Haifa (IL); Gilad Shmueli, Haifa (IL); Shmulik Branski, Haifa (IL)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 09/896,234

(22) Filed: Jun. 29, 2001

(65) Prior Publication Data

US 2003/0005234 A1 Jan. 2, 2003

(51) Int. Cl.
    *G06F 12/00* (2006.01)

(52) U.S. Cl. ...................... 711/143; 711/141; 711/133; 711/142; 711/144

(58) Field of Classification Search ................ 711/133, 711/141–144
See application file for complete search history.

(56) References Cited

U.S. PATENT DOCUMENTS 5,526,510 A * 6/1996 Akkary et al. ............... 711/133
5,669,014 A * 9/1997 Iyengar et al. ................. 710/22
5,699,548 A * 12/1997 Choudhury et al. ......... 711/142
5,761,501 A * 6/1998 Lubbers et al. ............. 707/100
5,768,558 A * 6/1998 Iyengar et al. .............. 711/143
5,986,490 A * 11/1999 Hwang et al. ............... 327/202
6,185,658 B1 * 2/2001 Arimilli et al. ............. 711/133
6,240,487 B1 * 5/2001 Liu et al. .................... 711/127
6,434,677 B1 * 8/2002 Breuder et al. ............. 711/156
6,735,675 B1 * 5/2004 Breuder et al. ............. 711/146
6,782,455 B1 * 8/2004 Palanca et al. .............. 711/143

\* cited by examiner

*Primary Examiner*—T Nguyen
(74) *Attorney, Agent, or Firm*—Kenyon & Kenyon LLP

(57) ABSTRACT

A system and method of optimizing system memory bus bandwidth in a computer system. The system prepares to receive first data from system memory in accordance with at least one read request by evicting previously stored second data to a write back buffer. The at least one read request is then issued consecutively to system memory via the system memory bus. After issuance of the at least one read request, at least one write request is issued consecutively to send the second data in the write back buffer to the system memory via the system memory bus. The consecutive issuance of read and write requests avoids read-to-write and write-to-read bubbles that occur when alternating read and write requests are issued to system memory.

25 Claims, 5 Drawing Sheets

SYSTEM AND METHOD FOR OPTIMIZING BUS BANDWIDTH UTILIZATION BY GROUPING CACHE WRITE-BACKS

FIELD OF THE INVENTION

The present invention relates to computer systems, and more particularly, but without limitation, relates to a system and method for optimizing memory bus bandwidth utilization in systems that have constant and balanced rates of read/write cycles.

BACKGROUND INFORMATION

Computer sub-systems such as three-dimensional (3D) graphics processors often include their own memory storage capacity implemented in one or more local memory caches ("local caches"). The local caches may store data such as the color and depth (Z) of a pixel or texture element (texel) and additionally may provide a storage queue for memory requests. Data stored in the local cache may be obtained via read requests, which are requests to extract data from a particular location in system memory. Data may also be expelled from the local cache back to system memory via write requests or write back requests which transfer the data to a particular location in system memory. Because the storage capacity of the local caches is generally limited, a request to read data from system memory (or a request for a future write) triggers a complementary request to evict (write back) data from the cache to make room for the data to be imported from system memory. Typically, the evicted data contains updated information that must be sent to system memory for storage. Therefore in such systems, read request cycles and requests for future writes are normally consecutively paired with write back cycles in the memory system bus traffic.

The sequential flow of read and write pairings causes sub-optimal performance because the system bus that delivers the read/write requests to memory has a period of down time whenever it switches between a read cycle and a write cycle, known, depending on the case, as a read-to-write bubble or a write-to-read bubble. FIG. 1 illustrates the bubbles in between an exemplary series of read and write requests. It is noted that the performance penalty for the bubble, measured in memory cycles, varies depending on the type of dynamic random access memory implemented in the system bus, such as RDRAM (Rambus DRAM) or SDRAM (synchronous DRAM).

An additional time lag is introduced by the local cache when it is forced to wait for a write back eviction to execute before issuing a read request. FIG. 2 illustrates a conventional sequence for a read request in a memory request allocation system 2. A read allocator 10 sends a read allocation request (step 1) to local cache 20 to initiate a write back eviction process. The local cache 20, in turn, prepares an entry for data that will be retrieved upon fulfillment of the read request by evicting cached data and sending a write request to memory (step 2). The local cache 20 then waits for acknowledgment that the write request eviction has been executed. Upon receiving acknowledgment that the write request has been executed (step 3), the read request issues to memory (step 4).

DETAILED DESCRIPTION

Figure 1:
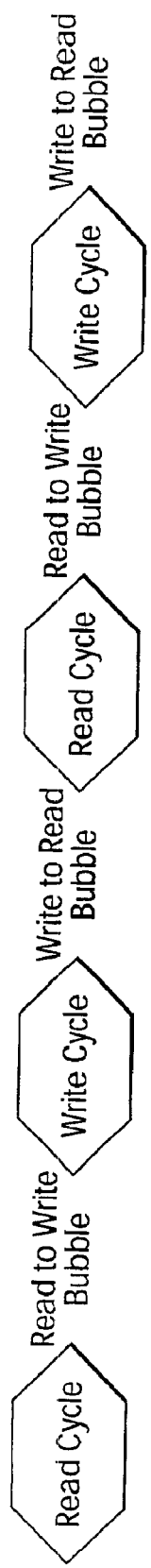
FIG. 1 illustrates exemplary traffic on a system memory bus that includes a series of consecutive read and write requests and time bubbles between the requests.
Figure 2:
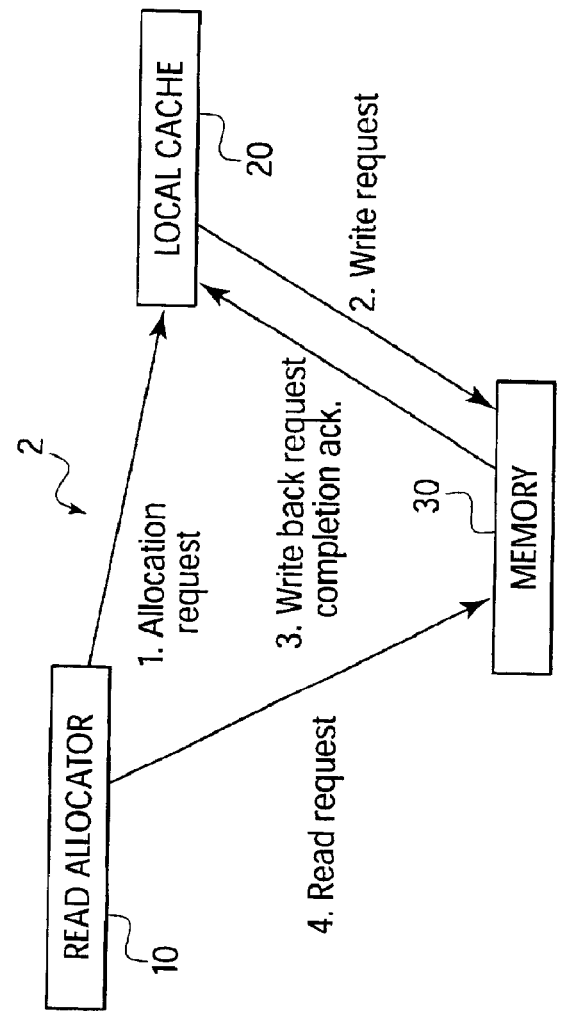
FIG. 2 is a block diagram that illustrates a sequence of events that occur to execute a conventional read request.
Figure 3:
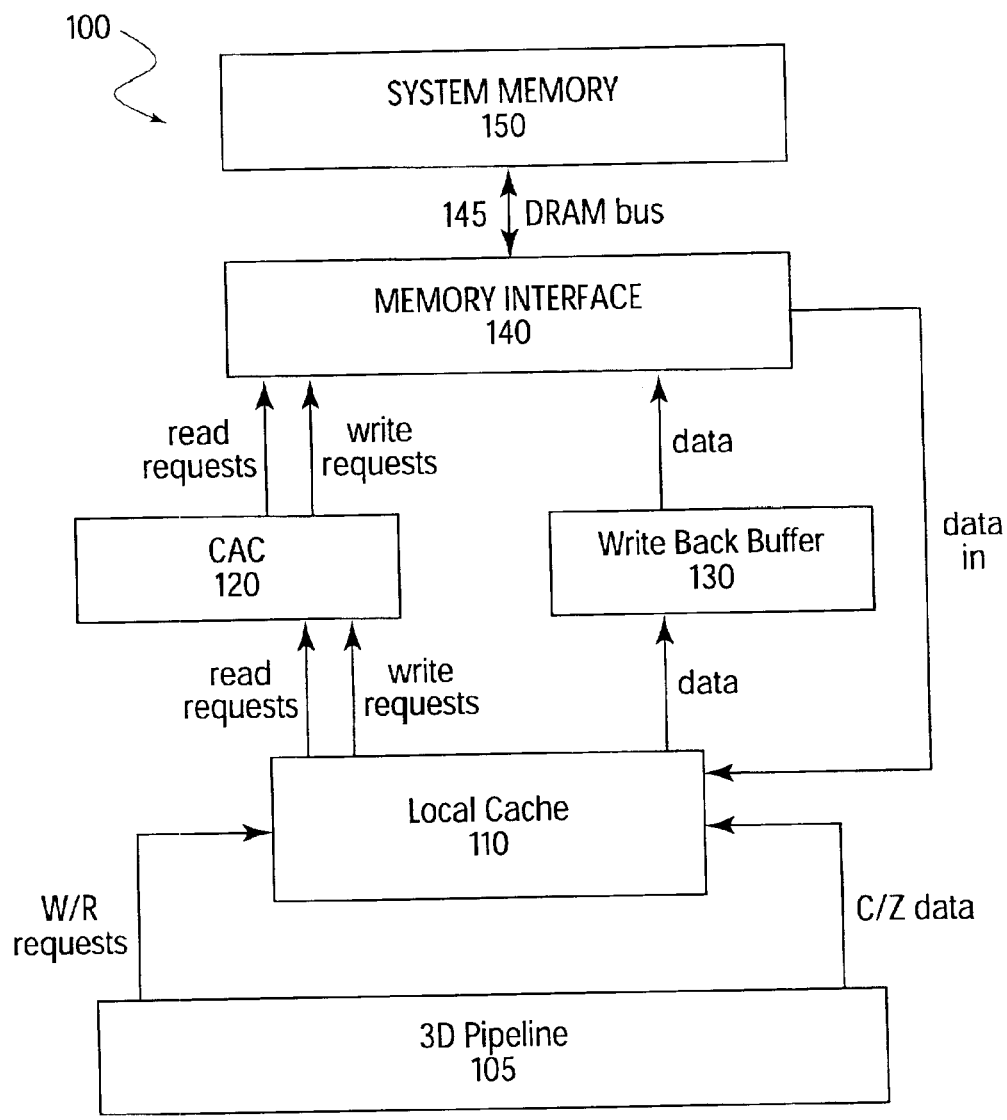
FIG. 3 is a block diagram that shows a 3D system according to an embodiment of the present invention

FIG. 3 is a block diagram of an embodiment of a 3D system 100 according to the present invention. A 3D Pipeline 105, which may be implemented as a graphics accelerator or processor, computes texel values, and issues both computed data and requests to read color and Z data directly to a local cache 110 in order to produce a screen mapping. The local cache 110 contains both logical and memory elements which are used to process the requests from the 3D Pipeline 105 and to store data for future use. As will be discussed in greater detail below, the local cache 110 can be configured to function in two modes, mode 1 and mode 2. The local cache 110 can interleave between mode 1 and mode 2, or alternatively, the cache can be functionally divided into two parts, one which stores data and requests in mode 1, and a second part which stores data and requests in mode 2. The memory resources of the local cache 110 are finite and limited in comparison to the memory resources of system memory 150, which as noted above, may be implemented with Dynamic Random Access Memory (DRAM).

When the local cache 110 is full, new read requests trigger data evictions from the cache in order to prepare entries for new data associated with the new read and write allocation cycles. Under typical steady-state conditions, this data is evicted to system memory 150, but in the system shown in FIG. 3, evicted data is sent to a write back buffer ("WBB") 130, which is a FIFO buffer having memory capacity to store several local cache 110 data evictions, along with the system memory addresses to which the data evictions are targeted. In one implementation, the WBB 130 has memory capacity to store four data evictions from the local cache 110.

Read and write requests are not sent directly from the local cache 110 to system memory 150 but are rather intercepted by a cycle arbitration control ("CAC") 120. Write requests are issued concurrently with the data evictions into the WBB 130. Both the initial read requests that trigger the evictions and the write back (eviction) requests are monitored at the CAC 120, which converts the read/write cycle pairs into a stream of consecutive read cycles followed by a stream of consecutive write cycles. The CAC 120 contains both a read request FIFO buffer and a write request FIFO buffer. The CAC 120 will issue a stored read cycle to system memory 150 before a write back cycle as long as the WBB 130 is not full (the CAC 120 also monitors the state of the WBB 130 via a "snoop" function). The write back cycles are then consecutively issued until all the data in the WBB 130 is sent to system memory 150. However, since a read cycle can only issue if there is no outstanding write request targeted to the same memory location in the WBB 130, the CAC 120 checks the WBB 130 entries before issuing a read cycle. If the WBB 130 does contain write cycles targeted to the same memory locations as the read cycles, the write cycles in the WBB 130 are issued before the read cycles.

By incorporating the WBB 130 and the CAC 120, the data for several write cycles is temporarily stored, allowing several read requests to issue consecutively to system memory, thus eliminating several read-to-write and write-to-read bubbles. After organizing the read and write requests into consecutive streams, the CAC 120 issues read and write requests to a memory interface 140, which regulates interaction with system memory 150. The interface issues the requests via DRAM bus 145 to system memory 150.

Figure 4:
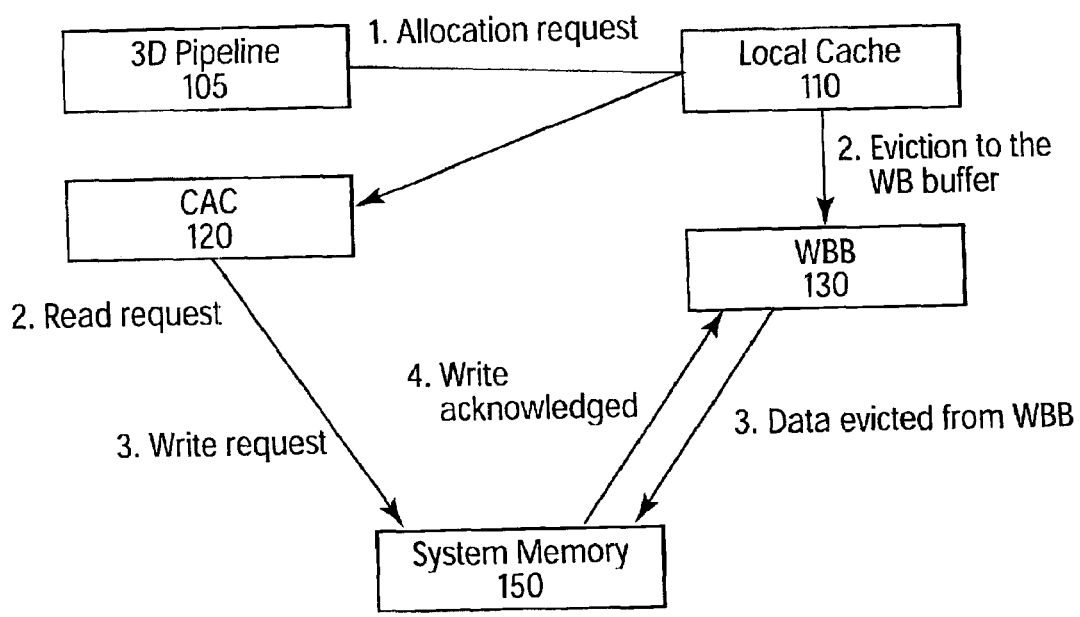
FIG. 4 is a block diagram that illustrates a sequence of events that occur to execute a read request according to the present invention.

FIG. 4 illustrates how, using the WBB 130 according to the present invention, issuance of read requests are no longer delayed by waiting for associated paired write back requests to execute. The 3D pipeline 105 sends a read allocation request (step 1) to local cache 110 to trigger a write back eviction. In step 2, the local cache 110 allocates an entry for the read request by evicting cached data to the WBB 130. Simultaneously (also step 2), the CAC 120 issues a read request to the memory interface 140. After several cycles, the WBB 130 becomes filled to capacity. At this point, in step 3, the CAC 120 begins to issue write request cycles to the memory interface and the WBB 130 also writes the data it has stored to the memory interface 140. The write requests are passed on to system memory, which returns acknowledgment to the memory interface 140 upon execution of the write requests (step 4).

Figure 5:
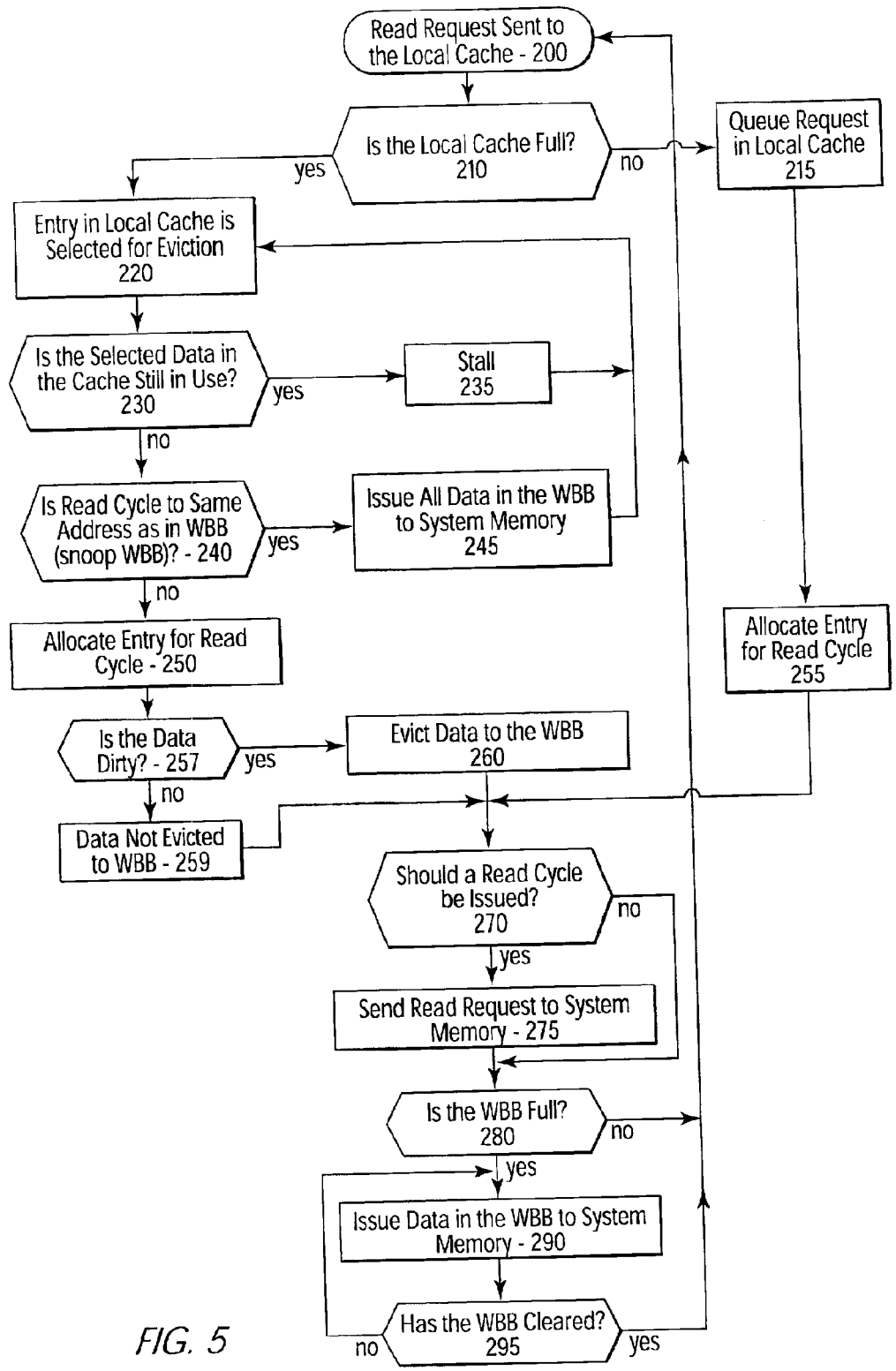
FIG. 5 is a flow chart of a method for optimizing memory bus bandwidth according to an embodiment of the present invention.

A more detailed discussion of an embodiment of the method of optimizing bus bandwidth according to the present invention follows with reference to the flow chart shown in FIG. 5. The process begins (step 200) when the 3D pipeline 105 sends a read (or write) allocation request to the local cache 110. In step 210, it is then determined whether the local cache is full. If the cache 110 is not full, the read or write allocation cycle is first queued in the local cache (in step 215), which then, having available capacity, allocates an entry for a read cycle (step 255). If the local cache 110 is full, in step 220, data is selected for eviction. In step 230, it is then determined whether the data selected for eviction is still being used by the 3D pipeline 105. If the data is being used, the process stalls (step 235) and cycles back to step 220, and a further entry in the local cache is selected for eviction while a corresponding check is performed to determine whether the selected data is still in use (step 230). If it is found that selected data is no longer is use, the CAC 120 performs a "snoop" function on the WBB 130 to check (step 240) whether the requested allocation cycle is targeted to the same memory address as one of the requests in the WBB 130. If so, according to one implementation, in step 245 all the data in the WBB 130 is issued to system memory 150. In an alternative implementation, only the data that shares the targeted memory address with the read request is issued to system memory 150. If, in step 240, it is determined by the CAC 120 snoop operation that none of the data in the WBB 130 is targeted to the same memory location as the allocation request, the local cache 110 allocates an entry for the read request (step 250).

The data that was selected for eviction is evicted to the WBB 130 (step 260), if the data is "dirty" (step 257), i.e., has been modified by the 3D pipeline 105, and therefore requires to be stored in system memory in case the updated data is required again for further processing. In the steady-state, most data is dirty because color and Z data for each pixel continually change as a graphical object is redrawn. Clean data is not evicted by to the WBB 130 (step 259) and may be overwritten.

After a read request has been allocated, either via step 250 or step 255, in step 270, a determination is made as to whether a read request should be issued to the system memory bus 145 which depends upon the local cache mode pertaining to the allocation request. In mode 1, consecutive groups of read cycles are issued to memory followed by a consecutive group of write back requests, in an alternating manner. The number of consecutive requests depends on the length of the WBB 130. For example, if the WBB is four entries long, four read requests, then four write requests, and then four read requests, etc. may be issued in succession. Mode 1 is typically employed where a transparent graphical object is being drawn and color data needs to be read from memory (in step 275) and merged with background color. If the WBB 130 is filled to capacity (step 280), the CAC 120 triggers the WBB to write the resulting merged color data back to system memory 150 (in step 290), creating balanced groups of consecutive read and consecutive write traffic. Similarly, Z data may also be read and written back in succession following the color data.

Mode 2 may be employed, for example, when pixels of an object to be drawn are part of an opaque object, obviating the need to read the color data for the pixels. However, a write request is issued to allocate an entry for a future write. In this case, read requests for color data should not be issued to memory in step 270. To allocate space for the write request, the CAC 120 still triggers the WBB 130 to write color data back to the system memory 150 (in step 290) in consecutive write back cycles if and when the WBB 130 is full (step 280). The issuance of the write cycles is then followed by issuance of groups of consecutive read cycles and write cycles for Z data. According to this mode, if the WBB 130 is four entries long, eight write requests (four for color, and four for Z) are issued for every four read requests that are issued (four for Z). As noted above, the local cache 110 can be configured to alternate between Mode 1 and Mode 2 and issue requests to the CAC 120 according to the particular Mode in operation.

During operation of either mode, once it is determined that the WBB 130 is full, the WBB 130 issues all the data it contains until it is cleared (via the loop in step 295). After the WBB 130 clears, the flow cycles back to step 200 when a new read request is sent to the local cache 110.

Figure 6:
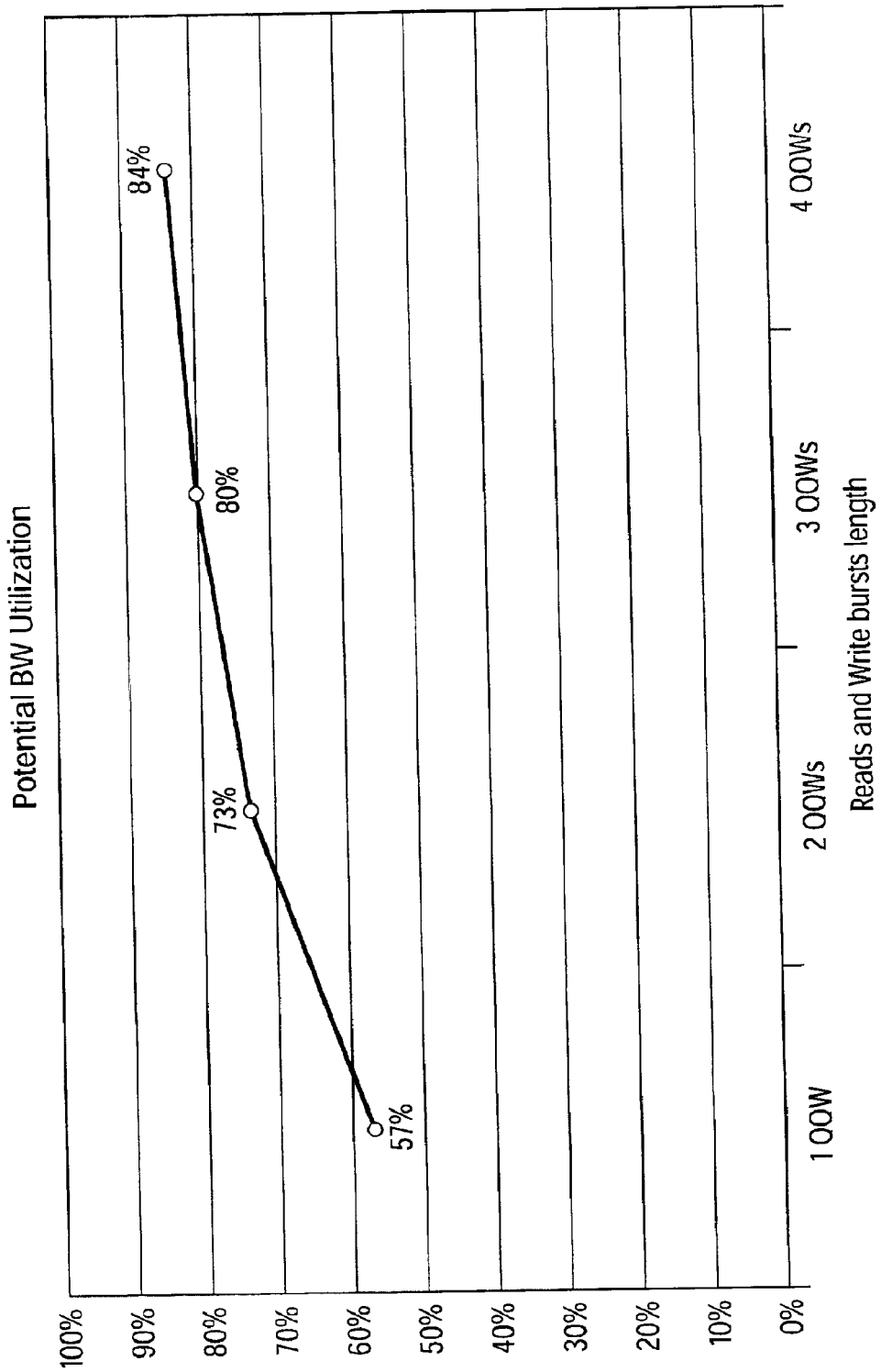
FIG. 6 is a graph that illustrates increasing bandwidth utilization as the number of read and write requests consecutively issued increases.

FIG. 6 shows a graph that plots rates of potential bandwidth utilization against the number of consecutive read and write cycles (burst length) sent to system memory 150 via the DRAM bus 145. As shown in FIG. 6, when read and write cycles are alternatingly issued, i.e., the burst length is equal to one (1), the potential bandwidth utilization is 57%. When the burst length is two (2), the potential utilization rate jumps to 73% and at higher burst lengths the utilization rate increases albeit in smaller increments. At a burst length of four (4), the potential bandwidth utilization rate is 84%. In a given implementation of the present invention, a burst length of four (4) consecutive requests is optimal. It is noted that the optimal burst length depends upon system parameters such as, for example, the number of clock cycles in a read-to-write (or write-to read) bubble, the number of clock cycles required to issue a single read request, and the number of clock cycles used by the CAC arbiter 120. It is understood that these parameters will differ depending on the system design and DRAM implementation, and that the implementations described should not be taken to be limiting.

At higher burst lengths, in the example given, higher than four, performance difficulties caused by a lack of synchronization in the 3D pipeline 105 are more prominent than any gains due to increase in potential bus utilization. When the pipeline 105 issues read requests targeted for system memory 150, the pipeline expects the requested data to return within a specific time period, after a set of calculations have been made, to establish texel values. If too many read requests are issued consecutively, the precise timing relationship between the request for and the retrieval of data may be thrown off, resulting in stalling in the 3D pipeline. It is intended that such stalling behavior be avoided whenever possible while attaining improvements in bandwidth utilization.

In the foregoing description, the method and system of the invention have been described with reference to a number of examples that are not to be considered limiting. Rather, it is to be understood and expected that variations in the principles of the method and apparatus herein disclosed may be made by one skilled in the art, and it is intended that such modifications, changes, and/or substitutions are to be included within the scope of the present invention as set forth in the appended claims. Furthermore, while the mechanisms described can be embodied in hardware within a computer processor, the invention is not necessarily limited thereby, and the programmed logic that implements the mechanisms can be separately embodied and stored on a storage medium, such as read-only-memory (ROM) readable by a general or special purpose programmable computer, for configuring the computer when the storage medium is read by the computer to perform the functions described above.

What is claimed is:

1. A method of optimizing system memory bus bandwidth comprising:
   receiving first data from a system memory in accordance with at least one read request by evicting, if a local cache is full, previously stored second data to a write back buffer;
   issuing the at least one read request to the system memory via a system memory bus; and
   after issuance of the at least one read request, issuing at least one write request to send the second data in the write back buffer to the system memory via the system memory bus.

2. The method of claim 1, further comprising:
   if a local cache is not full:
      preparing to receive first data from a system memory in accordance with at least one read request by queueing the at least one read request in the local cache; and
      allocating entries in the local cache for the first data.

3. A method of optimizing system memory bus bandwidth comprising:
   receiving first data from a system memory in accordance with at least one read request by evicting, if a local cache is full, previously stored second data to a write back buffer;
   issuing the at least one read request to the system memory via a system memory bus;
   after issuance of the at least one read request, issuing at least one write request to send the second data in the write back buffer to the system memory via the system memory bus;
   issuing each of the at least one read request consecutively before issuance of any of the at least one write request; and
   after issuance of the at least one read request, issuing each of the at least one write request consecutively before issuance of further read requests.

4. The method of claim 3, further comprising:
   selecting a portion of the second data for eviction;
   determining if the portion of the second data is still in use; and
   if it is determined that the portion of the second data is still in use:
      stalling issuance of the portion of the second data; and
      selecting a further portion of the second data for eviction.

5. The method of claim 3, wherein a number of the at least one read request consecutively issued is equivalent to a number of second data entries stored by the write back buffer.

6. The method of claim 3, further comprising:
   during issuance of the at least one read request, storing the at least one write request in a cycle arbitration control, the cycle arbitration control scheduling placement of read and write requests onto the system memory bus, the cycle arbitration control including a write FIFO buffer.

7. A method of optimizing system memory bus bandwidth comprising:
   receiving first data from a system memory in accordance with at least one read request by evicting, if a local cache is full, previously stored second data to a write back buffer;
   issuing the at least one read request to the system memory via a system memory bus; and
   after issuance of the at least one read request, issuing at least one write request to send the second data in the write back buffer to the system memory via the system memory bus;
   issuing each of the at least one read request consecutively before issuance of any of the at least one write request;
   after issuance of the at least one read request, issuing each of the at least one write request consecutively before issuance of further read requests;
   selecting a portion of the second data for eviction;
   determining if the portion of the second data is still in use; and
   if it is determined that the portion of the second data is still in use:
      stalling issuance of the portion of the second data; and
      selecting a further portion of the second data for eviction;
   determining if any of the second data in the write back buffer is targeted to a memory location in system memory equivalent to a memory location to which one of the at least one read request is targeted; and
   if it is determined that any of the second data is targeted to a memory location equivalent to a memory location to which one of the at least one read requests is targeted:
      issuing at least one write request to send the second data associated with the shared memory location to system memory.

8. The method of claim 7, further comprising:
   if is determined that none of the second data is targeted to a memory location in system memory equivalent to a memory location to which one of the at least one read request is targeted:
      allocating entries in the local cache for the first data; and
      if the second data has been updated, evicting the second data to the write back buffer.

9. The method of claim 8, further comprising:
before issuance of the at least one read request, determining whether a read request cycle should be issued in accordance with a local cache mode;
determining if the write back buffer is full; and
if it is determined that the write back buffer is full, issuing the second data in the write back buffer to system memory until the write back buffer clears.

10. The method of claim 9, further comprising:
if a local cache mode is in a first mode, sending the at least one read request to system memory before determining whether the write back buffer is full.

11. A computer system comprising:
a graphics pipeline;
a local cache coupled to the graphics pipeline, the local cache to receive instructions from the graphics pipeline in order to receive first data from a system memory in response to at least one read request, and to evict, if a local cache is full, previously stored second data;
a write back buffer coupled to the local cache to receive and store the second data evicted from the local cache; and
a system memory bus coupled to the local cache and the write back buffer;
wherein the local cache is to issue at least one read request to the system memory via the system memory bus and after issuance of the at least one read request, the local cache is to issue at least one write request to send the second data in the write back buffer to the system memory via the system memory bus.

12. A computer system, comprising:
a graphics pipeline;
a local cache coupled to the graphics pipeline, the local cache to receive instructions from the graphics pipeline in order to receive first data from a system memory in response to at least one read request, and to evict, if a local cache is full, previously stored second data;
a write back buffer coupled to the local cache to receive and store the second data evicted from the local cache;
a system memory bus coupled to the local cache and the write back buffer, wherein the local cache is to issue at least one read request to the system memory via the system memory bus and after issuance of the at least one read request, the local cache is to issue at least one write request to send the second data in the write back buffer to the system memory via the system memory bus; and
a cycle arbitration control coupled to the local cache, the write back buffer and the system memory bus, the cycle arbitration control to intercept all at least one read requests and at least one write requests issued by the local cache targeted to the system memory, the cycle arbitration control including a read request FIFO buffer and a write request FIFO buffer;
wherein the cycle arbitration control is to issue each of the at least one read request consecutively to the system memory via the system memory bus before issuance of any of the at least one write request, and after issuance of the at least one read request, the cycle arbitration control is to issue each of the at least one write request consecutively to the system memory via the system memory bus before issuance of further read requests.

13. The computer system of claim 12, wherein a number of the at least one read request consecutively issued by the cycle arbitration control is equivalent to a number of second data entries stored by the write back buffer.

14. An article comprising a computer-readable medium which stores computer-executable instructions for causing a computer system coupled to the article to:
allocate memory capacity for a write back buffer;
receive first data from a system memory in accordance with at least one read request by evicting, if a local cache is full, previously stored second data to a write back buffer;
issue the at least one read request to the system memory via a system memory bus; and
after issuance of the at least one read request, issue at least one write request to send the second data in the write back buffer to the system memory via the system memory bus.

15. An article comprising a computer-readable medium which stores computer-executable instructions for causing a computer system coupled to the article to:
allocate memory capacity for a write back buffer;
receive first data from a system memory in accordance with at least one read request by evicting, if a local cache is full, previously stored second data to a write back buffer;
issue the at least one read request to the system memory via a system memory bus;
after issuance of the at least one read request, issue at least one write request to send the second data in the write back buffer to the system memory via the system memory bus; and
causing a computer system coupled to the article to:
issue each of the at least one read request consecutively before issuance of any of the at least one write request; and
after issuance of the at least one read request, issue each of the at least one write request consecutively before issuance of further read requests.

16. The article of claim 15, wherein a number of the at least one read request consecutively issued is equivalent to a number of second data entries stored by the write back buffer.

17. An article comprising a computer-readable medium which stores computer-executable instructions for causing a computer system to:
allocate memory capacity for a write back buffer;
receive first data from a system memory in accordance with at least one read request by evicting, if a local cache is full, previously stored second data to a write back buffer;
issue the at least one read request to the system memory via a system memory bus;
after issuance of the at least one read request, issue at least one write request to send the second data in the write back buffer to the system memory via the system memory bus;
issue each of the at least one read request consecutively before issuance of any of the at least one write request;
after issuance of the at least one read request, issue each of the at least one write request consecutively before issuance of further read requests;
select a portion of the second data for eviction;
determine if the portion of the second data is still in use; and
if it is determined that the portion of the second data is still in use:

stall issuance of the portion of the second data; and
select a further portion of the second data for eviction.

18. The article of claim 17, further causing a computer system to:

determine if any of the second data in the write back buffer is targeted to a memory location in system memory equivalent to a memory location to which one of the at least one read requests is targeted; and if it is determined that any of the second data is targeted to a memory location equivalent to a memory location to which one of the at least one read requests is targeted:

issue at least one write request to send the second data associated with the shared memory location to system memory.

19. The article of claim 18, further causing a computer system to:

if is determined that none of the second data is targeted to a memory location in system memory equivalent to a memory location to which one of the at least one read request is targeted:

allocate entries in the local cache for the first data; and
if the second data has been updated, evict the second data to the write back buffer.

20. The article of claim 19, further causing a computer system to:

before issuance of the at least one read request, determine whether a read request cycle should be issued in accordance with a local cache mode;

determine if the write back buffer is full; and if it is determined that the write back buffer is full, issue the second data in the write back buffer to system memory until the write back buffer clears.

21. The article of claim 20, further causing a computer system to:

if a local cache mode is in a first mode, send the at least one read request to system memory before determining whether the write back buffer is full.

22. A method of optimizing system memory bus bandwidth comprising:

separately grouping read requests from write requests in an issuance sequence by use of a write back buffer, the write back buffer temporarily to store data evicted from a local cache; and issuing separate groups of at least one read request and at least one write request in accordance with a local cache mode;

wherein:

in a first local cache mode, equal numbers of groups of at least one read request and groups of at least one write request are issued to system memory, in a second local cache mode, one or more groups of at least one write request are issued to system memory, and in an alternating mode, for each group of at least one read request that is issued to system memory, one or more groups of at least one write request are issued to system memory.

23. The method of claim 22, wherein selected data is evicted to the write back buffer by the local cache if the following are true:

(a) the local cache is full;
(b) the selected data is not being used; and
(c) the selected data has been updated.

24. A processor comprising:

a first memory portion configured to receive instructions from a graphics pipeline in order to receive first data from a system memory following at least one read request, and to evict, if the first memory potion is full, previously stored second data to receive the first data;

a second memory portion coupled to the first memory portion to receive and store the second data evicted from the first memory portion; and a system memory bus coupled to the first and second memory portions;

wherein the first memory portion is to arrange sending the second data in the second memory potion to the system memory via the system memory bus after an issue of a read request to the system memory.

25. A processor comprising:

a first memory portion configured to receive instructions from a graphics pipeline in order to receive first data from a system memory following at least one read request, and to evict, if the first memory portion is full, previously stored second data to receive the first data;

a second memory portion coupled to the first memory portion to receive and store the second data evicted from the first memory portion;

a system memory bus coupled to the first and second memory portions;

wherein the first memory portion is to arrange sending the second data in the second memory portion to the system memory via the system memory bus after an issue of a read request to the system memory; and control coupled to the first memory portion, the second memory portion and the system memory bus, the control to intercept all at least one read requests and at least one write requests issued by the first memory portion targeted to the system memory, the control including a read request FIFO buffer and a write request FIFO buffer;

wherein the control is to issue each of the at least one read request consecutively to the system memory via the system memory bus before issuance of any of the at least one write request, and after issuance of the at least one read request, the control is to issue each of the at least one write request consecutively to the system memory via the system memory bus before issuance of further read requests.

* * * * *